(12) United States Patent
Mueller-Schlomka et al.

(10) Patent No.: US 10,168,485 B2
(45) Date of Patent: Jan. 1, 2019

(54) OPTICAL ADAPTOR FOR MOUNTING TO A RECEPTACLE TO OPTICALLY COUPLE CONNECTORIZED OPTICAL CABLES

(71) Applicant: CORNING OPTICAL COMMUNICATIONS LLC, Hickory, NC (US)

(72) Inventors: Gordon Mueller-Schlomka, Berlin (DE); Michael Wimmer, Berlin (DE)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/600,208

(22) Filed: May 19, 2017

(65) Prior Publication Data
US 2017/0254962 A1 Sep. 7, 2017

Related U.S. Application Data

(63) Continuation of application No. PCT/US2015/061524, filed on Nov. 19, 2015.

(30) Foreign Application Priority Data

Dec. 2, 2014 (EP) .................................. 14195836

(51) Int. Cl.
*G02B 6/38* (2006.01)

(52) U.S. Cl.
CPC ........... *G02B 6/3825* (2013.01); *G02B 6/387* (2013.01); *G02B 6/3874* (2013.01);
(Continued)

(58) Field of Classification Search
CPC .... G02B 6/3825; G02B 6/387; G02B 6/3874; G02B 6/3891; G02B 6/3893; G02B 6/3894
(Continued)

(56) References Cited

U.S. PATENT DOCUMENTS 5,274,729 A 12/1993 King et al.
6,464,406 B1 10/2002 Yarita et al.
(Continued)

FOREIGN PATENT DOCUMENTS

EP 689069 A1 12/1995
GB 2386694 A 9/2003
(Continued)

OTHER PUBLICATIONS

European Patent Office; International Search Report and Written Opinion for Internatonal Patent Application No. PCT/US2015/061524; Filed Nov. 19, 2015; dated Apr. 14, 2016; pp. 1-11.

*Primary Examiner* — Jerry Blevins
(74) *Attorney, Agent, or Firm* — Michael E. Carroll, Jr.

(57) ABSTRACT

An optical adaptor for mounting to a receptacle to optically couple connectorized optical cables comprises an optical interface to optically couple a first connectorized optical cable terminated by a first optical connector and a second connectorized optical cable terminated by a second optical connector. The optical adaptor further comprises a mounting element being configured to insert the optical interface and being mountable to the receptacle. The mounting element is secured to the receptacle, when the first optical connector is mounted to the mounting element in a first state, and the mounting element is released from the receptacle, when the first optical connector is mounted to the mounting element in a second state allowing to pull the optical adaptor out of the receptacle.

15 Claims, 7 Drawing Sheets

(52) U.S. Cl.
CPC ......... *G02B 6/3891* (2013.01); *G02B 6/3893* (2013.01); *G02B 6/3894* (2013.01); *G02B 6/3897* (2013.01)

(58) Field of Classification Search
USPC .......................................................... 385/56
See application file for complete search history.

(56) References Cited

U.S. PATENT DOCUMENTS

| | | | |
|---|---|---|---|
| 6,648,520 B2 | 11/2003 | McDonald et al. | |
| 2009/0148102 A1* | 6/2009 | Lu ........................ | G02B 6/3816 385/60 |
| 2010/0202737 A1* | 8/2010 | Saunders ............. | G02B 6/3825 385/69 |
| 2014/0133804 A1 | 5/2014 | Lu et al. | |
| 2014/0241688 A1* | 8/2014 | Isenhour ............. | G02B 6/3825 385/135 |

FOREIGN PATENT DOCUMENTS

| | | | |
|---|---|---|---|
| WO | 2016036692 A1 | 3/2016 | |
| WO | 2016036693 A1 | 3/2016 | |
| WO | 2016077168 A2 | 5/2016 | |

\* cited by examiner

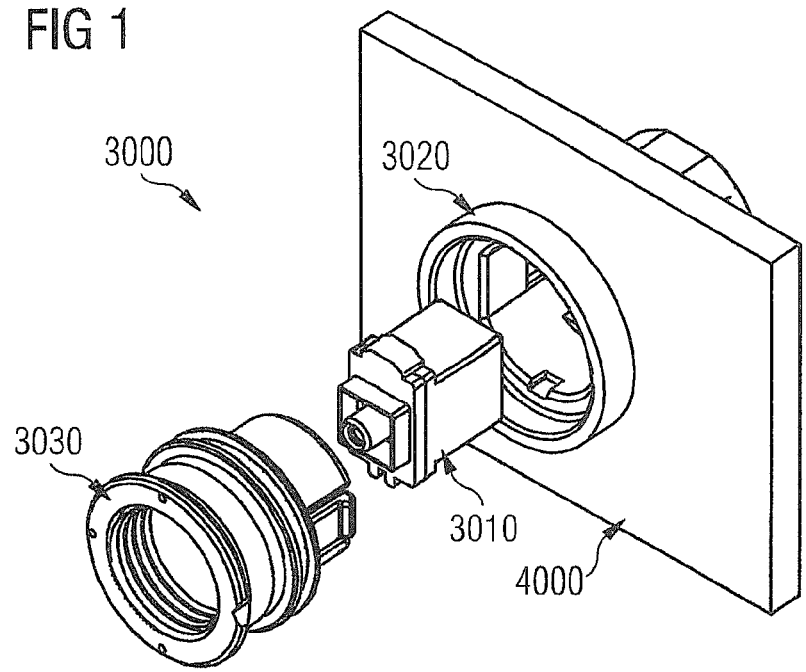
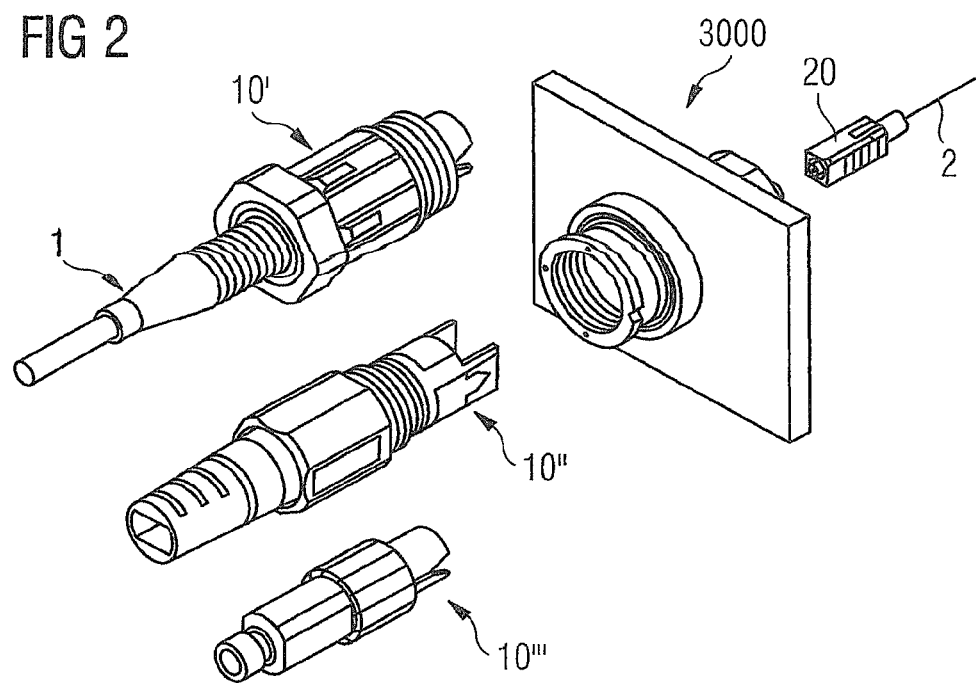

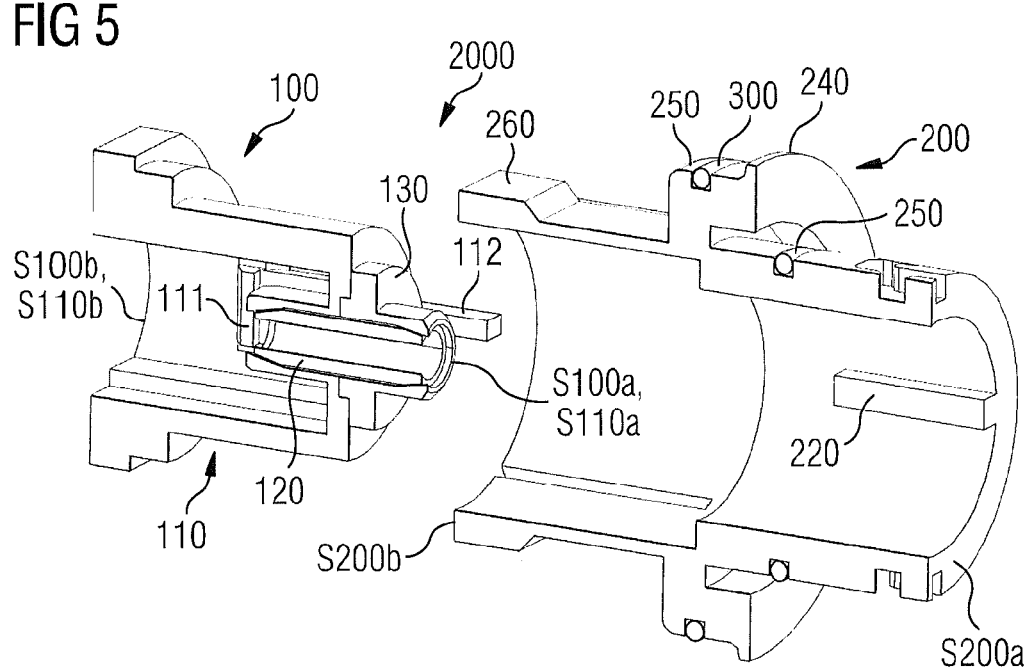
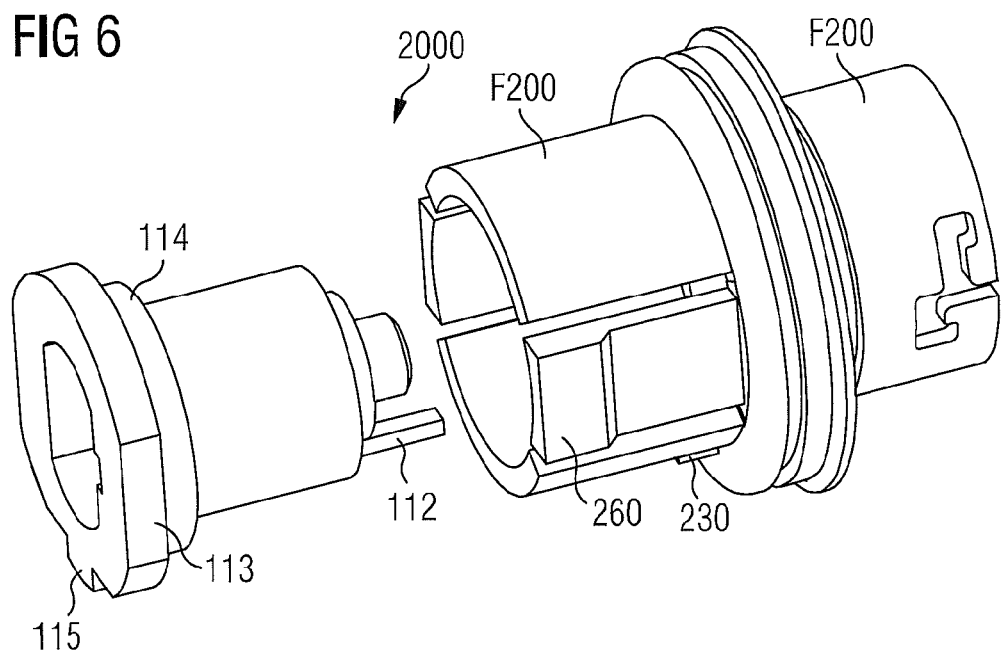

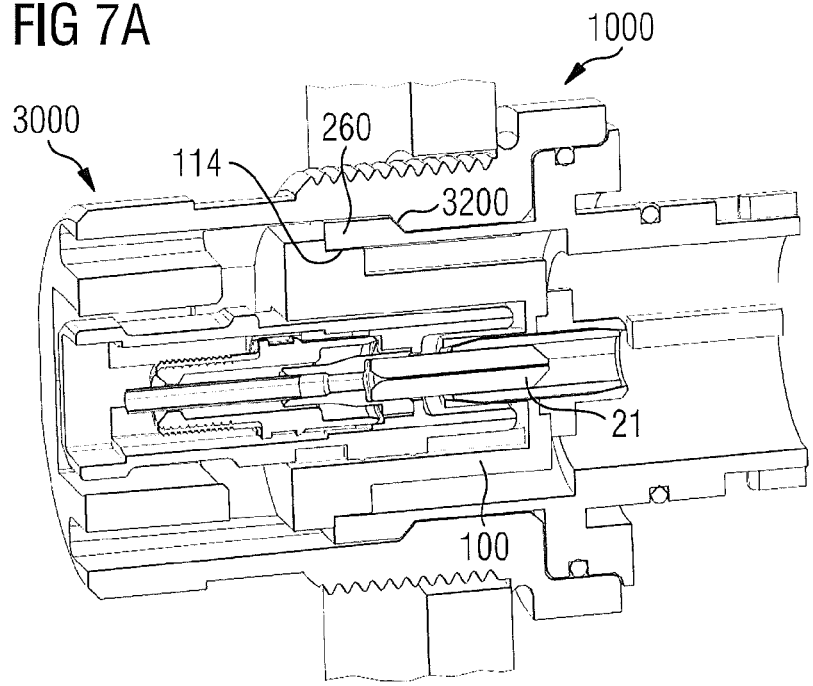
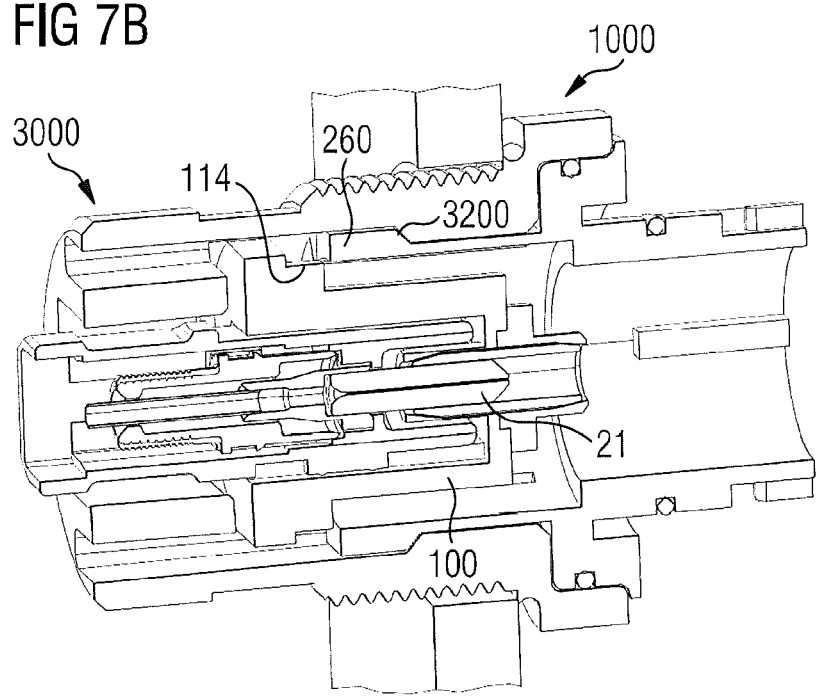

OPTICAL ADAPTOR FOR MOUNTING TO A RECEPTACLE TO OPTICALLY COUPLE CONNECTORIZED OPTICAL CABLES

PRIORITY APPLICATION

This application is a continuation of International Patent Application Serial No. PCT/US15/61524, filed on Nov. 19, 2015, which claims the benefit of priority under 35 U.S.C. § 119 of European Patent Application Serial No. 14195836.3, filed on Dec. 2, 2014, the contents of which are relied upon and incorporated herein by reference in their entireties.

FIELD

The disclosure relates to an optical adaptor for mounting to a receptacle to optically couple connectorized cables. Connectorized cables include, for example, cables with connectors installed on them in the field, and cables with connectors installed on them in the factory being preconnectorized optical cables. Such connectorized optical cables respectively comprise at least one optical fiber which is to optically connect to each other. The disclosure further relates to an optical assembly to optically couple connectorized cables, for example, preconnectorized optical cables to each other.

BACKGROUND

Optical cables, such as fiber optic drop cables, are capable of transmitting an extremely large amount of bandwidth compared with copper cables. The development in communication networks tends to bring optical cables closer to subscribers to have access to the increased bandwidth. However, there are certain obstacles that make it challenging and/or expensive to route optical cables deeper into the communication network, i.e. closer to a subscriber.

For instance, making a suitable optical connection between optical waveguides is much more difficult than making an electrical connection between copper wires. This is because optical connections require special tools and equipment, highly trained craftsmen, along with precision components. Additionally, as the communication network pushes towards subscribers, the communication network requires more connections, which compounds the difficulties of providing optical waveguides to the premises of the subscriber.

In order to couple generic cables having a simple structure, for example copper cables, the ends of the cables may be terminated by suitable pairs of connectors such as complementarily shaped connectors. In order to ensure the coupling of light between fiber optic cables with low attenuation, the ends of the optical fibers to be coupled have to be precisely aligned.

A precise alignment of optical fibers to be connected to each other may be ensured by using a receptacle/an optical port being adjusted to receive the optical connectors respectively terminating each of the optical cables including the optical fibers. In order to couple a first and a second cable with connectors on them, for example, preconnectorized optical cable, a first optical connector terminating the first optical cable may be inserted in the receptacle at a first side of the receptacle, and a second optical connector terminating the second optical cable may be inserted in the receptacle at a second side of the receptacle. The first optical connector may be configured as a sealed connector and the second optical connector may be configured as an unsealed connector terminating an optical cable which is coupled to a sealed device. The first optical connectors and the receptacle have to allow to establish the connection of the first optical cable on sealed devices, like antennas, closures etc. in harsh environment.

The receptacle provides at least a mounting function for the optical connectors terminating the optical cables. The receptacle may also provide a mechanical coupling function for the optical connectors and an optical coupling function for the optical fibers of the optical cables. In order to provide the mechanical and optical coupling function the receptacle may comprise a coupling element. The coupling element is usually configured to receive the first optical connector at a first side of the coupling element and to receive the second optical connector at a second side of the coupling element.

The receptacle is usually adapted to the type of optical connectors to be coupled. A receptacle may, for example, be designed by a manufacturer to couple the first optical connector of a first type to the second optical connector of the same type or a second different type. The first optical connector may be a connector made by the same manufacturer which also produces the receptacle. The second optical connector may be a connector of an industrial standard. Several industrial standard connector types are available such as SC connector, ST connector and LC connector.

The precise coupling of connectorized cables such as preconnectorized optical cables will be challenging, if one of the optical connectors has to be replaced by an optical connector of another type and a subscriber do not wish to substitute the already pre-installed receptacle. Assuming that the exchanged first optical connector is an optical connector being produced by another manufacturer than the manufacturer of the primarily installed receptacle, the new first optical connector will not be compatible with the existing receptacle. If the exchanged optical connector has a different size and/or shape than the previously installed first optical connector which was used thitherto with the receptacle, the newly used first optical connector may often not even be inserted in the receptacle let alone optically coupled to the second optical connector. In this case, it is necessary to use an optical adaptor as an intermediate part between the new first optical connector, the receptacle and the second optical connector.

There is a need to provide an optical adaptor being mountable to a receptacle to optically couple connectorized optical cables such as preconnectorized optical cables which allows a precise alignment and coupling of the optical fibers of the connectorized optical cables in a harsh environment. There is also a desire to provide an optical assembly to optically couple connectorized optical cables such as pre-connectorized optical cables to ensure a precise alignment and coupling of the optical fibers of the connectorized optical cables in a harsh environment.

SUMMARY

An embodiment of an optical adaptor for mounting to a receptacle to optically couple connectorized optical cables is specified in claim 1.

According to an embodiment of an optical adaptor for mounting to a receptacle to optically couple connectorized optical cables, the optical adaptor comprises an optical interface to provide a passageway for inserting a ferrule of a first optical connector terminating a first one of the connectorized optical cables and a ferrule of a second optical connector terminating a second one of the connectorized optical cables to optically couple the first and the second connectorized optical cable. The optical adaptor further comprises a mounting element being mountable to the receptacle to hold the optical adaptor. The mounting element is configured to receive the optical interface. The mounting element is configured to mechanically couple the first optical connector to the mounting element so that the ferrule of the first optical connector intrudes in the passageway of the optical interface at a first side of the optical interface. The optical interface has a second side to mechanically couple the second optical connector to the optical interface such that the ferrule of the second optical connector intrudes in the passageway of the optical interface. The optical interface is configured to be insertable to the receptacle and to secure the mounting element to the receptacle in a first position of the optical interface inside the receptacle and to release the mounting element from the receptacle in a second position of the optical interface inside the receptacle. The mounting element is configured to mount the first optical connector at the mounting element in a first state in which the optical interface is moved in the receptacle to the first position and to mount the first optical connector at the mounting element in a second state in which the optical interface is moved in the receptacle to the second position.

An embodiment of an optical assembly to optically couple connectorized optical cables is specified in claim 13.

According to an embodiment of the optical assembly to optically couple connectorized optical cables, the optical assembly comprises the optical adaptor for mounting to a receptacle to optically couple connectorized optical cables as specified above, and a receptacle to hold the optical adaptor. The receptacle is formed as a hollow body to receive the coupling element and the mounting element of the optical adaptor.

BRIEF DESCRIPTION OF THE FIGURES

FIG. 1 is a perspective view of a receptacle to couple optical cables;

FIG. 2 shows first optical connectors of a different type to be connected to a second optical connector by a receptacle;

FIG. 5 shows a perspective sectional view of an optical adaptor for mounting to a receptacle to optically couple connectorized optical cables;

FIG. 6 shows a perspective view of an optical adaptor for mounting to a receptacle to optically couple connectorized optical cables;

FIG. 7A shows a cross-sectional view of an optical assembly to optically couple connectorized optical cables with an optical adaptor and a receptacle in a locked configuration;

FIG. 7B shows a cross-sectional view of an optical assembly to optically couple connectorized optical cables with an optical adaptor and a receptacle in an unlocked configuration;

DETAILED DESCRIPTION

Figure 3:
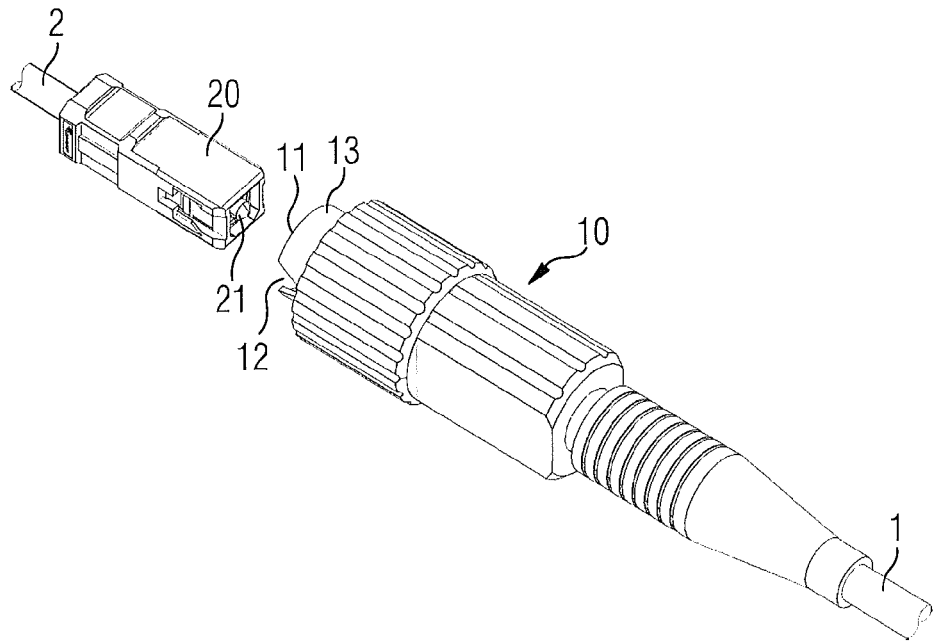
FIG. 3 shows connectorized optical cables to be connected.

The disclosure will now be described in more detail hereinafter with reference to the accompanying drawings showing different embodiments. The concepts disclosed may, however, be embodied in many different forms and should not be construed as limited to the embodiments set forth herein; rather, these embodiments are provided so that the disclosure will fully convey the scope to those skilled in the art. The drawings are not necessarily drawn to scale but are configured to clearly illustrate the concepts.

FIG. 1 shows an embodiment of a receptacle 3000 comprising a coupling element 3010 to which an optical connector terminating an optical cable, for example a fiber optic drop cable, may be connected. The receptacle 3000 comprises a fixture 3020 arranged in a bore hole of a housing 4000 such as a housing of a distribution closure. The receptacle 3000 comprises a fixation adaptor 3030 which may be mounted to the fixture 3020 by inserting the fixation adaptor into the fixture 3020. The fixation adaptor 3030 may comprise snap hooks to engage the fixation adaptor 3030 to the fixture 3020 and to securely hold the fixation adaptor 3030 inside the fixture 3020. The coupling element 3010 may be inserted and securely held in the fixation adaptor 3030. The coupling element 3010 is configured to connect a first optical connector terminating a first optical cable to a second optical connector terminating a second optical cable. The coupling element 3010 is further configured to optically couple an optical fiber of the first optical cable to an optical fiber of the second optical cable.

FIG. 2 shows connectorized optical cables such as a preconnectorized optical cable 1, for example a fiber optic drop cable, which is terminated at its end by an optical connector 10' of a first type. FIG. 2 shows other optical connectors 10" and 10'" being of a different second and third type. The optical connectors 10', 10" and 10'" are configured as sealed connectors. Another optical cable 2 is terminated at its end by optical connector 20 being of a fourth type. The optical connector 20 may be configured as an unsealed connector, for example a connector of a SC industrial standard type. Several industrial standard connector types are available such as SC connector, ST connector or LC connector. These connectors are connected to the optical fiber to align it relative to a ferrule provided within the assembly. The front face of the connector is used to align the optical fiber. In the detailed embodiment, the assembly is described using an SC connector. Other connectors such as ST or LC connector may be used instead of an SC connector what requires adaption to the particular front face of the connector and the changes required are apparent to a skilled artisan. Cable 1 may be a cable with a connector installed on it. The connector may be installed in the factory being a preconnectorized optical cable. This disclosure and the described embodiments contemplate also connectorized cables with connectors installed on them in the field.

The receptacle 3000 comprises the coupling element 3010, the fixture 3020 and the fixation adaptor 3030 as illustrated in FIG. 1. The receptacle 3000 is configured to optically couple the preconnectorized optical cable 1 being terminated with the optical connector 10' to the preconnectorized optical cable 2 being terminated with the optical connector 20. The optical cable 2 may be connected to a sealed device like an antenna or may be arranged inside a sealed device like a closure. The optical connector 10' and the receptacle have to be embodied to allow to establish the connection of the first optical cable 1 on sealed devices, like antennas, closures etc. in harsh environment. In particular, the optical connector 10' may be connected to the coupling element 3010 at the front side of the coupling element, and the optical connector 20 may be fixed to the coupling element 3010 at a rear side of the coupling element such that the optical fibers of the optical cable 1 and 2 are aligned to each other so that an optical attenuation of light coupled between the preconnectorized optical cables 1 and 2 is reduced.

Due to the required precise alignment of the optical fibers of the optical cables to be coupled to each other the receptacle 3000 and particularly the coupling element 3010, the fixture 3020 and the fixation adaptor 3030 of the receptacle are usually adapted to couple specific types of optical connectors to each other. The receptacle 3000 may be designed to couple the optical connector 10' of the first type to the optical connector 20 of the fourth type. However, the receptacle 3000 is not configured to couple the optical connector 20 with one of the other optical connectors 10", 10"' being of the second and third type.

In order to avoid a complete exchange of the receptacle 3000 for coupling one of the optical connectors 10" and 10"' to the optical connector 20, an optical adaptor has to be arranged between the receptacle 3000 and the respective optical connector 10", 10"' as an intermediate component to couple one of the optical connectors 10", 10"' to the optical connector 20 or to couple one of the optical connectors 10", 10"' to a first side of the optical adaptor and to couple the existing coupling element 3010 of the receptacle 3000 to a second side of the optical adaptor.

FIG. 3 shows connectorized optical cables 1 and 2 to be connected. The optical cable 1 is terminated by the optical connector 10 so that the optical cable 1 is a connectorized optical cable which is a preconnectorized cable in the present embodiment. The optical connector 10 may be configured as a sealed optical connector. A ferrule 11 of the optical connector 10 is surrounded by a shroud 13 of the optical connector 10. The optical connector 20 may terminate the optical cable 2 so that the optical cable 2 is a connectorized optical cable and in this embodiment a preconnectorized optical cable.

The optical connector 20 may be configured as an unsealed connector. The optical cable 2 may be connected to a sealed device, for example an antenna, or may be disposed inside a housing, such a distribution closure. The respective ferrule 11 and 21 of the optical connectors 10 and 20 encapsulate a respective optical fiber of the optical cables 1 and 2. The optical connectors 10 and 20 cannot be directly be connected with each so that an optical adaptor has to be designed as a connecting part to optically couple the two connectors.

Figure 4:
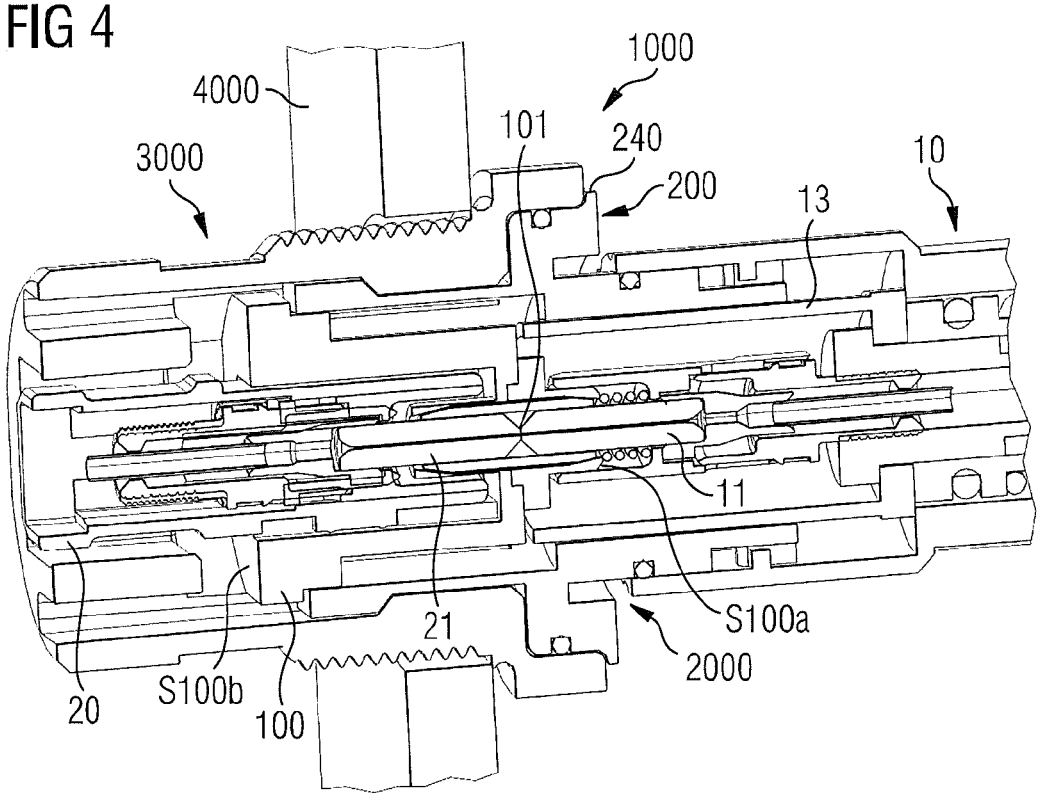
FIG. 4 shows a cross-sectional view of an optical assembly to couple connectorized optical cables.

FIG. 4 shows an embodiment of an optical assembly 1000 to optically couple connectorized optical cables 1 and 2 illustrated in FIG. 3. The optical assembly 1000 comprises an optical adaptor 2000 being configured to receive the optical connector 10 terminating the optical cable 1 and the optical connector 20 terminating the optical cable 2 at opposite sites. The optical adaptor 2000 allows to optically couple the respective optical fiber of the optical cables 1 and 2 to transfer light between the optical cables 1 and 2 with low loss. The optical assembly 1000 further comprises a receptacle 3000 to hold the optical adaptor 2000. The receptacle 3000 is configured to be arranged in a bore hole of a housing 4000, such as a housing of a distribution closure. The receptacle 3000 mainly has the function of the fixture 3020 shown in FIG. 1.

The optical adaptor 2000 comprises an optical interface 100 to optically couple the connectorized optical cables 1 and 2 and a mounting element 200 being mountable to the receptacle 3000. The optical connector 20 may be mechanically coupled to the optical interface 100 at the side S100b of the optical interface. The mounting element 200 is configured to receive the optical interface 100 and to mechanically couple the optical connector 10 to the mounting element 200. The mounting element 200 is formed as a hollow body having a side S200a with an opening to receive the optical connector 10 in the hollow body of the mounting element 200. In the mechanically coupled state of the optical connector 10 and the mounting element 200 the shroud 13 of the optical connector 10 is inserted in the hollow body of the mounting element 200.

The optical adaptor 2000 is configured to optically couple the ferrules 11 and 21 of the optical connectors 10 and 20, when the optical connector 10 is mounted to the mounting element 200 and the optical connector 20 is inserted in the optical interface 100. The optical interface 100 is configured to provide a passageway 101 for inserting the ferrule 11 of the optical connector 10 and for inserting the ferrule 21 of the optical connector 20.

The optical adaptor 2000 is configured such that the ferrule 11 of the optical connector 10 intrudes in the passageway 101 of the optical interface 100 at a side S100a of the optical interface, when the optical connector 10 is mechanically coupled to mounting element 200. The optical adaptor 2000 is further configured such that the ferrule 21 of the optical connector 20 intrudes in the passageway 101 of the optical interface 100, when the optical connector 20 is mechanically coupled to the optical interface 100 at the side S100b. In the mounted state of the optical connectors 10 and 20, end faces of the ferrules 11 and 21 abut in the passageway 101. The passageway 101 provides an alignment for the ferrules 11 and 21 so that the optical fibers inside the ferrules are optically coupled for transferring light with low attenuation.

FIG. 5 shows a perspective sectional view of the optical adaptor 2000 for mounting to the receptacle 3000 to optically couple connectorized optical cables, and FIG. 6 shows a perspective view of the optical adaptor 2000 and the receptacle 3000.

The mounting element 200 comprises an alignment element 220 extending from the opening at the side S200a of the mounting element 200 into the hollow body of the mounting element 200. The alignment element 220 may be formed as a stay located at the inner surface of the hollow body of the mounting element 200. The alignment element 220 of the mounting element 200 may be configured to engage in an alignment element 12 of the optical connector 10 shown in FIG. 3 to direct the insertion of the optical connector 10 to the mounting element 200. The mounting element 200 has a side S200b with an opening to receive the optical interface 100. The mounting element 200 may comprise an outer surface F200 having a section which is formed as a shoulder 240 located between the side S200a and the side S200b of the mounting element 200. The mounting element 200 is configured such that the shoulder 240 abuts on the receptacle 2000 when the mounting element 200 is mounted to the receptacle 3000, as shown in FIG. 4.

The optical adaptor 2000 may comprise a sealing element 300 to provide a sealing between the mounting element 200 and the receptacle 3000 in the mated configuration of the optical adaptor 2000 and the receptacle 3000. The mounting element 200 may comprise at least one notch 250 to dispose the sealing element 300. As shown in FIG. 4, the optical adaptor may comprise two sealing element 300 which may be configured as O-rings and are disposed in the notches 250.

The optical interface 100 may comprise a coupling element 110 having a hollow body to receive the optical connector 20. The coupling element 110 has a side S110a having an opening for the passageway 101 leading into the hollow body of the coupling element and a side S110b to couple the optical connector 20 to the optical interface 100. The optical interface 100 may further comprise a ferrule coupler 120 to provide the passageway 101 to couple the ferrule 11 of the optical connector 10 to the ferrule 21 of the optical connector 20. A first portion of the ferrule coupler 120 intrudes in the hollow body of the coupling element 110 and a second portion of the ferrule coupler 120 protrudes from the side S110a of the coupling element 110. The ferrule coupler may be formed as a tube or sleeve which is disposed in the opening of the coupling element 110 at the side S110a of the coupling element 110. The ferrule coupler 120, for example the sleeve, is configured to align the ferrules 11 and 21, as shown in FIG. 4. The optical interface 100 may further comprise a holding element 130 to surround at least the second portion of the ferrule coupler 120 and to fix the ferrule coupler 120 to the coupling element 110. The holding element 130 may be disposed at the side S110a of the coupling element 110.

The coupling element 110 may comprise an alignment and fixing element 111 to direct the insertion of the optical connector 20 to the coupling element 110 in a predefined orientation and to fix the optical connector 20 to the coupling element 110. The optical connector 20 may comprise an appropriate alignment and fixing element having a complementary shape in relation to the alignment and fixing element 111 of the coupling element 110. The alignment and fixing element 111 may comprise an engagement element to engage in an appropriate engagement element of the alignment and fixing element of the optical connector 20 to fix the optical connector 20 to the optical interface 100 after having inserted the optical connector 20 into the hollow body of the coupling element 110.

The coupling element 110 may comprise a stay 112 protruding from the side S110a of the coupling element 110. The stay 112 may be configured to engage in the alignment element 12 of the optical connector 10 when inserting the optical connector 10 at the side S200a in the mounting element 200 to direct the insertion of the ferrule 11 of the optical connector 10 to the passageway 101 of the optical interface 100. According to another simplified embodiment of the coupling element 110, the coupling element is provided without the stay 112.

In order to mount the optical adaptor 2000 to the receptacle 3000, the optical interface 100 is inserted in the receptacle 3000. Afterwards, the mounting element 200 is inserted in the receptacle 3000 and receives the optical interface 100 in the hollow body of the mounting element 200 at the side S200b of the mounting element. The coupling element 110 comprises an alignment element 113 to direct the insertion of the coupling element 110 into the hollow body of the mounting element 200 such that the end face of the stay 112 abuts on the end face of the alignment element 220 of the mounting element 200. When the optical connector 10 is mounted to the mounting element 200, the alignment element 12 of the optical connector 10 engages in the alignment element 220 of the mounting element 200 formed as a stay on the inner surface of the mounting element 200 and in the stay 112 of the coupling element 110 to direct the insertion of the ferrule 11 of the optical connector 10 into the passageway 101.

The mounting element 200 may comprise an alignment element 230 to direct the insertion of the mounting element 200 to the receptacle 3000. The alignment element 230 may be formed as a nose protruding from the shoulder 240 of the mounting element 200. The receptacle 3000 may comprise a complementarily shaped alignment element which fits to the alignment element 230 such that the alignment element 230 of the mounting element 200 and the appropriate alignment element of the receptacle 3000 engage when the mounting element 200 is inserted in the receptacle 3000 in the predefined direction. The alignment element 230 of the mounting element 200 and the complementarily formed alignment element of the receptacle 3000 ensure that the mounting element 200 may be inserted only in a predefined direction into the receptacle 3000 and any rotation of the mounting element 200 or the optical adaptor 2000 in the receptacle 3000 is prevented.

The mounting element 200 may comprise a fixing element 260 to fix the mounting element 200 to the receptacle 3000. The fixing element 260 may be formed as a snap hook being configured to engage in a structure of the receptacle 3000 to secure the mounting element 200 and thus the optical adaptor 2000 to the receptacle 3000. As shown in the embodiment of the mounting element 200 of FIGS. 5 and 6, the snap hook may be formed as a part of the surface F200 of the mounting element 200 between the side S200b of the mounting element and the shoulder 240. The coupling element 110 may comprise an abutment element 114 which allows to engage the fixing element 260 of the mounting element 200 to the structure or engagement area of the receptacle 3000.

The coupling element 110 may comprise an alignment element 115 to direct the insertion of the coupling element 110 into the receptacle 3000. The receptacle 3000 may be provided with an appropriate alignment element in which the alignment element 115 of the coupling element 110 engages when inserting the coupling element 110 in the receptacle 3000 in the prescribed orientation.

According to an embodiment of the optical adaptor, the optical interface 100 is configured to be insertable in the receptacle 3000 and to secure the mounting element 200 to the receptacle 3000 in a first position of the optical interface 100 inside the receptacle 3000. FIG. 7A shows the optical interface 100 in the first position inside the receptacle 3000. In the first position of the optical interface 100 the abutment element 114 presses against the fixing element 260 of the mounting element 200 so that the mounting element 200 is fixed to an appropriate formed structure 3200 of the receptacle 3000. The structure 3200 of the receptacle 3000 may comprise an engagement area being formed such that the fixing element 260, for example the snap hook shown in FIG. 6, may engage in the engagement area of the receptacle 3000 to secure the mounting element 200 to the receptacle 3000. In the locked configuration shown in FIG. 7A, the optical adaptor 2000 is fixed to the receptacle 3000.

The optical interface 100 is further configured to release the mounting element 200 from the receptacle 3000 in a second position of the optical interface 100 inside the receptacle 3000. FIG. 7B shows the optical interface 100 being arranged in the receptacle 3000 in the second position. In comparison to the first position of the optical interface 100 shown in FIG. 7A, the second position of the optical interface 100 is closer to the opening of the receptacle 2000 to insert the optical connector 20. In the unlocked configuration shown in FIG. 7B the fixing element 260, for example the snap hook, of the mounting element 200 are not supported by the abutment element 114 and are rather freely movable so that the mounting element 200 can be removed from the receptacle 3000 by pulling the mounting element out of the receptacle.

Figure 8:
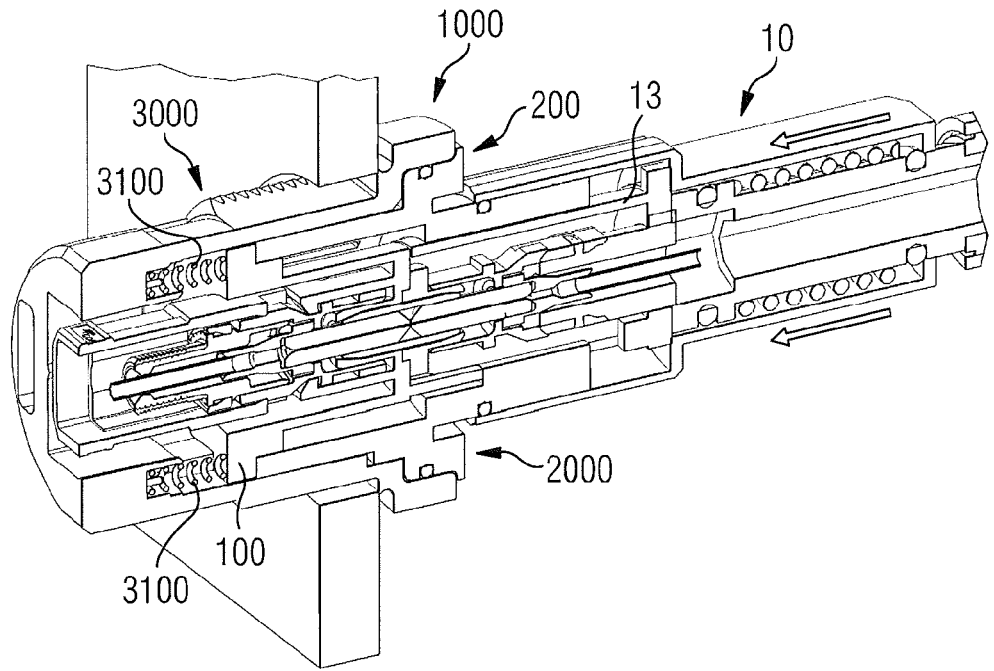
FIG. 8 shows a perspective sectional view of an optical assembly to optically couple connectorized optical cables with an optical connector being mounted at a mounting element in a first state.

According to a possible embodiment of the optical adaptor 2000, the mounting element 200 is configured to mount the optical connector 10 to the mounting element 200 in a first state/position S1 and a second state/position S2. FIG. 8 shows a cross-sectional view of the optical assembly 1000 comprising the optical adaptor 2000 and the receptacle 3000. The optical connector 10 is mounted to the mounting element 200 in the first state/position S1. The receptacle 3000 comprises a spring element 3100 being configured to push the optical interface 100 of the optical adaptor 2000 against the optical connector 10 and the mounting element 200 to the first position inside the receptacle 3000 so that the abutment element 114 of the coupling element 110 presses against the fixing element 260 of the mounting element and the fixing element 260 engages to the engagement area 3200 of the receptacle, as shown in FIG. 7A. In the first mounting state S1 of the optical connector 10 the mounting element 200 is secured to the receptacle 3000.

Figure 9:
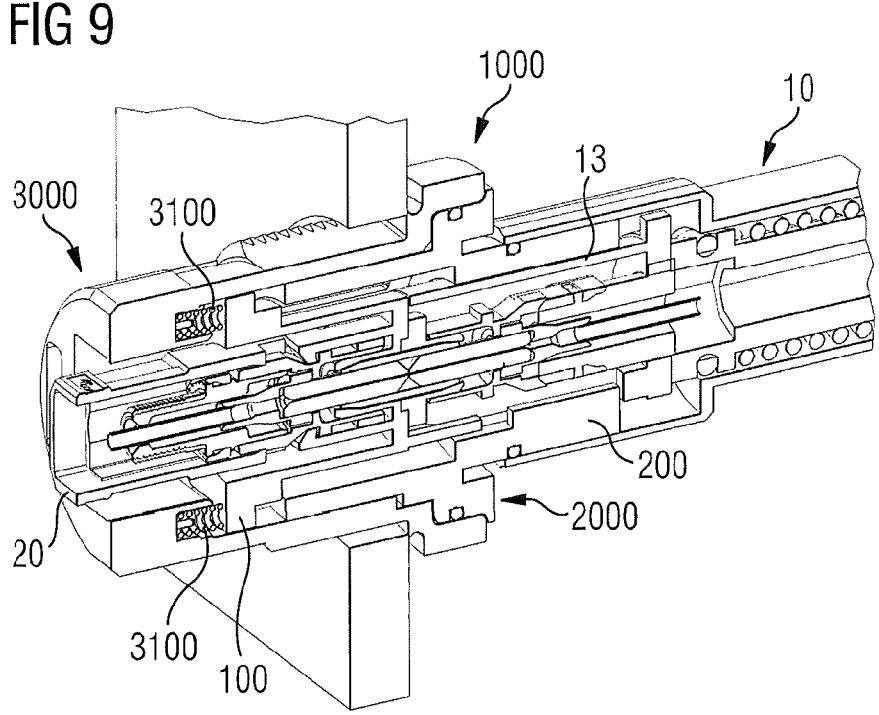
FIG. 9 shows a perspective sectional view of an optical assembly to optically couple connectorized optical cables with an optical connector being mounted at a mounting element in a second state.

FIG. 9 shows the optical assembly 1000, wherein the optical connector 10 is mounted to the mounting element 200 in the second position. In the second position of the optical connector 10, the optical connector 10 is moved closer to the receptacle 3000 so that the shroud 13 of the optical connector 10 pushes the optical interface 100 against the spring element 3100. As a consequence of this, the spring element 3100 pushes the optical interface 100 to the second position inside the receptacle 3000 to release the mounting element 200 from the receptacle 3000, when the optical connector 10 is mounted to the mounting element 200 of the optical adaptor 2000 in the second state/position S2.

In order to release the mounting element 200 from the receptacle 3000, the optical interface 100 is moved closer to the opening of the receptacle 3000, the opening being configured to insert the optical connector 20. As shown in FIG. 7B, in the second mounting state S2 of the optical connector 10 the abutment element 114 of the coupling element 110 releases the fixing element 260 so that the fixing element 260, for example the snap hooks, are no longer blocked by the optical interface 100. In the unlocked configuration of the optical assembly shown in FIG. 9 and FIG. 7B, the whole assembly including the optical connector 20, the optical interface 100 and the mounting element 200 can be taken out of the receptacle 3000.

Figure 10:
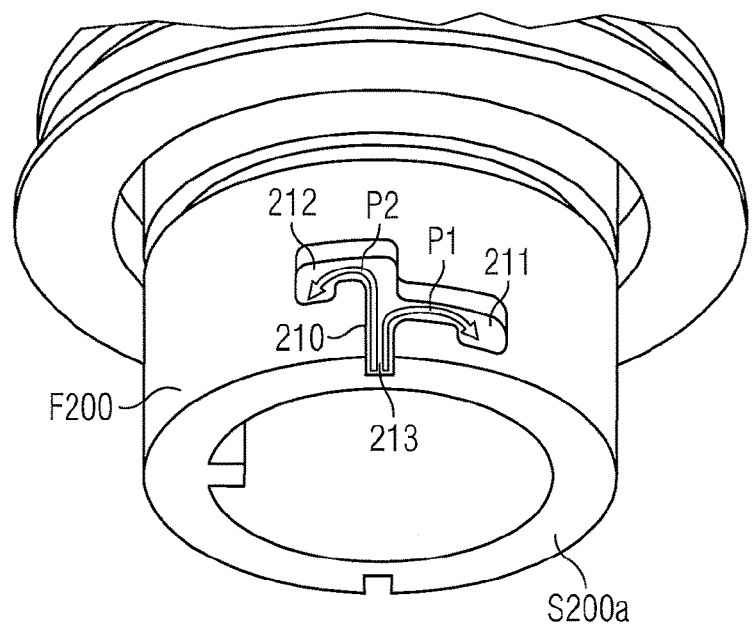
FIG. 10 shows an embodiment of a mounting element of an optical adaptor.

According to an embodiment of the optical adaptor, the mounting element 200 is configured to mount the optical connector 10 at the mounting element 200 in the first state S1 in which the optical interface 100 is moved in the receptacle 3000 to the first position, and to mount the optical connector 10 at the mounting element 200 in the second state S2 in which the optical interface 100 is moved in the receptacle 3000 to the second position. FIG. 10 shows an embodiment of the mounting element 200 comprising a mounting zone 210 being formed to mount the optical connector 10 to the mounting element 200 in the first state/position S1 and the second state/position S2.

The mounting zone 210 may comprise an area 211 in/on the surface F200 of the mounting element 200 to mount the optical connector 10 to the mounting element 200 in the first state/position S1. The mounting zone 210 may further comprise an area 212 in/on the surface F200 of the mounting element 200 to mount the optical connector 10 to the mounting element 200 in the second state/position S2.

As shown in FIG. 10, the areas 211 and 212 of the mounting zone 210 are regionally spaced apart from each other in/on the surface F200 of the mounting element 200. The area 211 of the mounting zone 210 is arranged closer to the side S100a of the optical interface 100 than the area 212 of the mounting zone. Each of the areas 211 and 212 of the mounting zone 210 may be formed as a cavity in the surface F200 of the mounting element 200, as shown in FIG. 10. According to another embodiment, the areas 211 and 212 may be formed as a protrusion on the surface F200 of the mounting element 200. The mounting zone 210 may comprise a slit 213 in the surface F200 of the mounting element. The slit 213 ends in the cavities 211 and 212.

The optical connector 10 may be mounted to the mounting element 200 by means of a bayonet locking mechanism. The optical connector 10 may comprise an engagement means having a complementary shape in relation to the shape of the mounting zone 210 so that the engagement means of the optical connector 10 may engage in the areas 211, 212 of the mounting zone 210 of the mounting element 200, when the optical connector 10 is mechanically coupled to the mounting element 200.

Figure 11A:
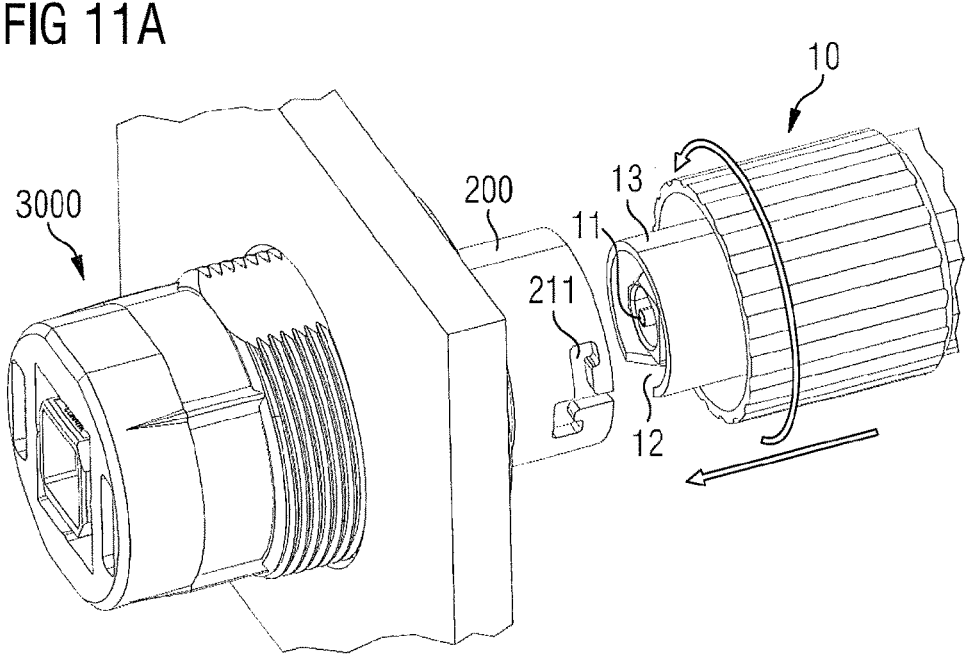
FIG. 11A shows a perspective view of an optical assembly to optically couple connectorized optical cables with an optical connector to turn to secure an optical adaptor to a mounting element of the optical assembly.
Figure 11B:
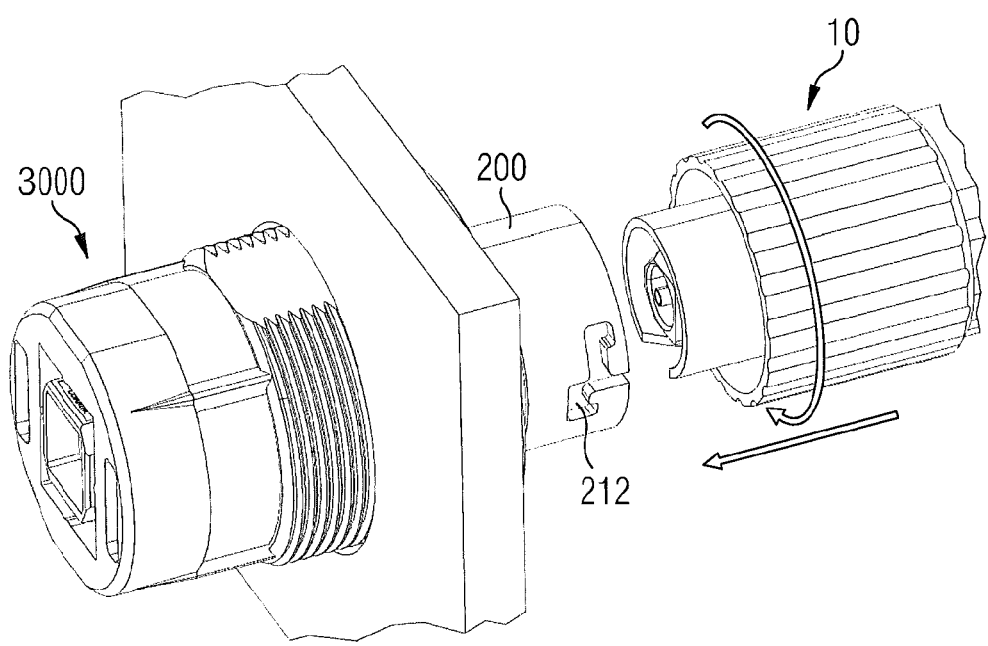
FIG. 11B shows a perspective view of an optical assembly to optically couple connectorized optical cables with an optical connector to turn to release an optical adaptor from a mounting element of the optical assembly.

FIGS. 11A and 11B show the optical connector 10 and the optical assembly 1000 to optically couple connectorized optical cables. The alignment element 12 of the optical connector 10 may be configured as a cavity disposed in the shroud 13 of the optical connector 10 which engages in the alignment element 220 of the coupling element 200 and the stay 112 of the coupling element 110, when the optical connector 10 is inserted in the predefined direction into the optical adaptor 2000.

In order to secure the optical adaptor 2000 to the receptacle 3000, the optical connector 10 is pushed into the optical adaptor 2000 and turned in a first direction in the state S1 to engage in the area 211 of the mounting zone, as shown by the arrow in FIG. 11A. In the state S1, i.e. in the locked configuration, the optical adaptor 2000 is securely fixed to the receptacle 3000. In order to release the optical adaptor 2000, the optical connector 10 is inserted in the optical adaptor 2000 and turned in a second direction opposite to the first direction in the state S2 to engage in the area 212 of the mounting zone, as shown in FIG. 11B. In this state S2, i.e. in the unlocked configuration, the fixing element 260 is released by pushing the optical interface 100 backwards so that the optical adaptor 2000 and the optical connector 20 can be removed from the receptacle 2000 by pulling the optical adaptor and the optical connector 10 out of the receptacle 3000.

We claim:

1. An optical adaptor for mounting to a receptacle to optically couple connectorized optical cables, comprising:
    an optical interface comprising a passageway for inserting a ferrule of a first optical connector terminating a first one of the connectorized optical cables and a ferrule of a second optical connector terminating a second one of the connectorized optical cables to optically couple the first and the second connectorized optical cable; and a mounting element being mountable to the receptacle, the mounting element being configured to receive the optical interface; wherein:

the mounting element is configured to mechanically couple the first optical connector to the mounting element so that the ferrule of the first optical connector intrudes in the passageway of the optical interface at a first side of the optical interface;

the optical interface has a second side to mechanically couple the second optical connector to the optical interface such that the ferrule of the second optical connector intrudes in the passageway of the optical interface;

the optical interface is configured to be insertable to the receptacle and to secure the mounting element to the receptacle in a first position inside the receptacle and to release the mounting element from the receptacle in a second position inside the receptacle; and the mounting element is configured to mount the first optical connector at the mounting element in a first state at which the optical interface is moved in the receptacle to the first position and to mount the first optical connector at the mounting element in a second state at which the optical interface is moved in the receptacle to the second position.

2. The optical adaptor of claim 1, wherein the mounting element comprises a mounting zone being formed to mount the first optical connector to the mounting element.

3. The optical adaptor of claim 2, wherein the mounting zone comprises a first area in/on the surface of the mounting element to mount the first optical connector to the mounting element in the first state and a second area in/on the surface of the mounting element to mount the first optical connector to the mounting element in the second state, the first and second area of the mounting element being spaced apart from each other in/on the surface of the mounting element.

4. The optical adaptor of claim 3, wherein the first area of the mounting zone is arranged closer to the first side of the optical interface than the second area of the mounting zone.

5. The optical adaptor of claim 3, wherein the first and second area of the mounting zone are formed as a first cavity and a second cavity, respectively, in the surface of the mounting element.

6. The optical adaptor of claim 5, wherein the mounting zone comprises a slit in the surface of the mounting element, the slit ending in the first and the second cavity.

7. The optical adaptor of claim 1, wherein the mounting element comprises a fixing element to fix the mounting element to the receptacle.

8. The optical adaptor of claim 7, wherein the fixing element is formed as a snap hook being configured to engage in a structure of the receptacle to secure the mounting element to the receptacle.

9. The optical adaptor of claim 1, wherein the optical interface comprises a coupling element having a first side and a second side to couple the second optical connector to the optical interface, wherein the optical interface comprises a ferrule coupler to provide the passageway to couple the ferrule of the first optical connector to the ferrule of the second optical connector, the ferrule coupler being attached to the coupling element at the first side of the coupling element.

10. The optical adaptor of claim 9, wherein the optical interface comprises a holding element to fix the ferrule coupler to the coupling element.

11. The optical adaptor of claim 9, wherein the coupling element comprises an abutment element to abut to a fixing element of the mounting element, wherein the abutment element of the coupling element is configured to engage the fixing element of the mounting element to the receptacle to secure the mounting element to the receptacle, when the coupling element is disposed in the receptacle and the mounting element is mounted to the receptacle and the first optical connector is mounted to the mounting element in the first state, wherein the abutment element of the coupling element is configured to release the fixing element of the mounting element from the receptacle to release the mounting element from the receptacle, when the coupling element is disposed in the receptacle and the mounting element is mounted to the receptacle and the first optical connector is mounted to the mounting element in the second state.

12. The optical adaptor of claim 9, wherein the coupling element comprises a stay protruding from the first side of the coupling element, the stay being configured to engage in an alignment element of the first optical connector to direct the insertion of the ferrule of the first optical connector to the passageway of the optical interface.

13. An optical assembly to optically couple connectorized optical cables, comprising:

the optical adaptor for mounting to a receptacle to optically couple connectorized optical cables as claimed in claim 1, a receptacle to hold the optical adaptor, the receptacle being formed as a hollow body to receive the optical interface and the mounting element of the optical adaptor.

14. The optical assembly of claim 13, wherein the receptacle comprises a spring element being configured to push the optical interface of the optical adaptor to the first position inside the receptacle so that the mounting element is secured to the receptacle, when the first optical connector is mounted to the mounting element of the optical adaptor in the first position, and to push the optical interface of the optical adaptor to the second position inside the receptacle to release the mounting element from the receptacle, when the first optical connector is mounted to the mounting element of the optical adaptor in the second state.

15. The optical assembly of claim 13, wherein the receptacle comprises a structure being formed to engage a fixing element of the mounting element to the receptacle to secure the mounting element to the receptacle, when the optical interface is disposed in the receptacle and the mounting element is mounted to the receptacle and the first optical connector is mounted to the mounting element in the first position.

* * * * *

UNITED STATES PATENT AND TRADEMARK OFFICE
CERTIFICATE OF CORRECTION

PATENT NO. : 10,168,485 B2
APPLICATION NO. : 15/600208
DATED : January 1, 2019
INVENTOR(S) : Gordon Mueller-Schlomka et al.

It is certified that error appears in the above-identified patent and that said Letters Patent is hereby corrected as shown below:

On the Title Page

Column 2, item (56), other publications, Line 2, delete "Internatonal" and insert -- International --, therefor.

Signed and Sealed this
Third Day of September, 2019

Andrei Iancu
*Director of the United States Patent and Trademark Office*